May 15, 1934.    E. F. NORELIUS    1,959,060
LUBRICATING SYSTEM
Filed Feb. 2, 1931    5 Sheets-Sheet 1

Inventor
E. F. Norelius
by
Attorney

May 15, 1934.　　　　E. F. NORELIUS　　　　1,959,060
LUBRICATING SYSTEM
Filed Feb. 2, 1931　　　5 Sheets-Sheet 2

Inventor
E. F. Norelius
by
Attorney

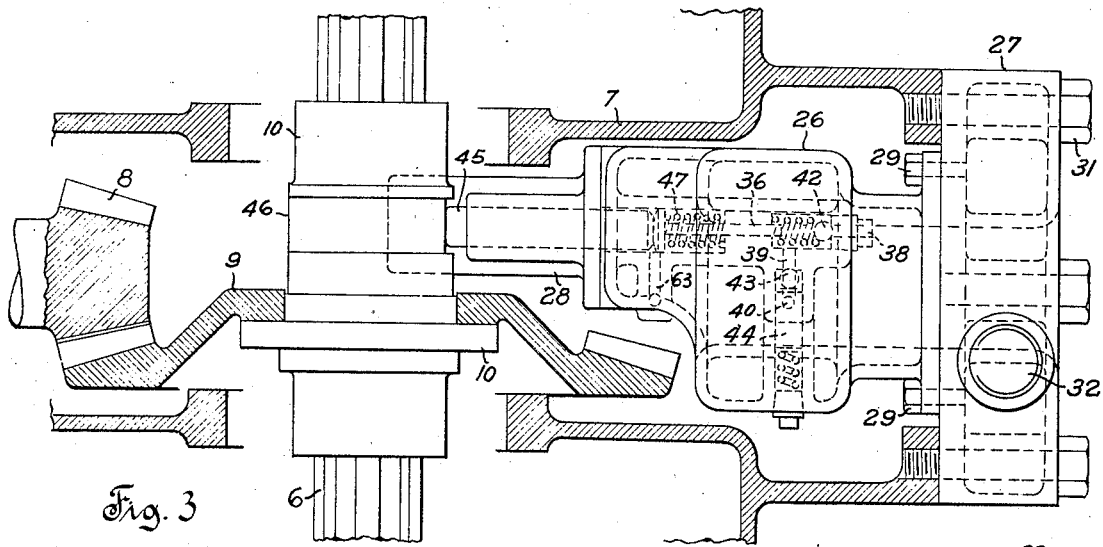
Fig. 3
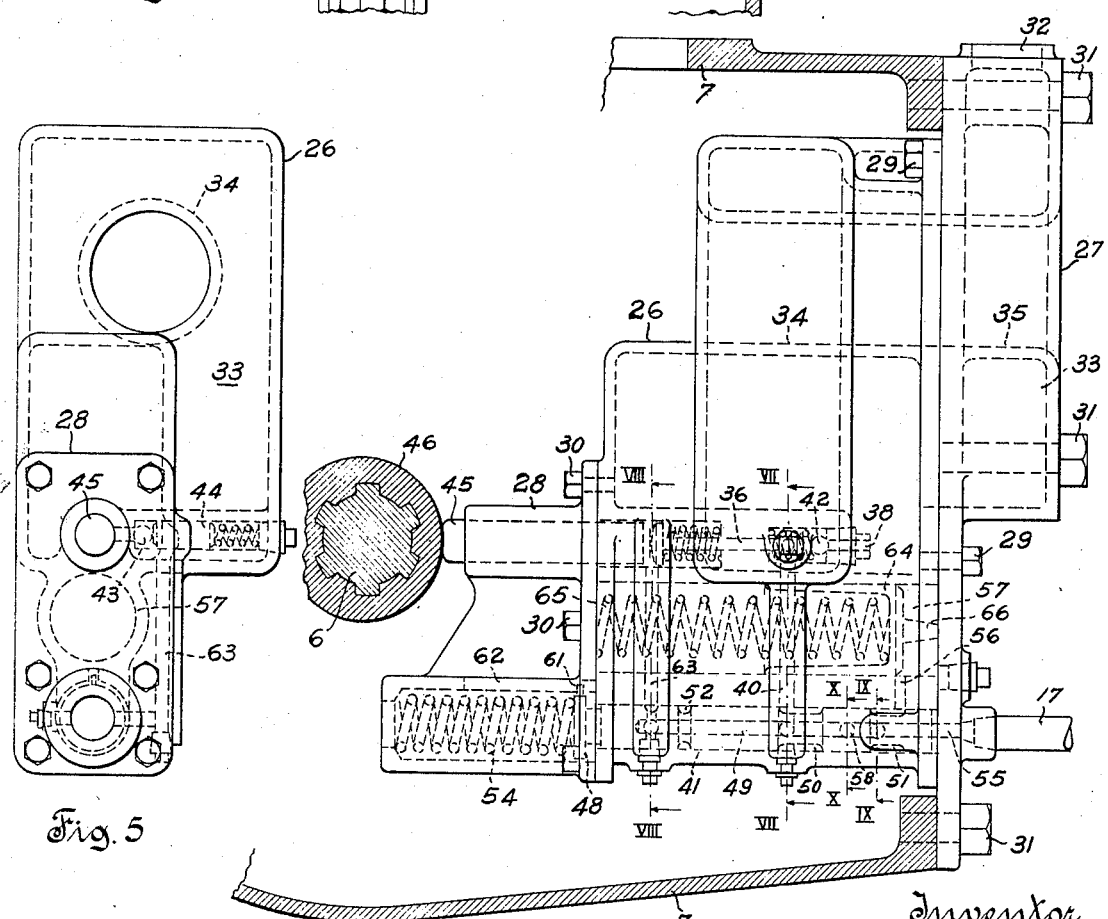
Fig. 5
Fig. 4
Inventor
E. F. Norelius
by
Attorney

May 15, 1934.　　　　E. F. NORELIUS　　　　1,959,060
LUBRICATING SYSTEM
Filed Feb. 2, 1931　　　　5 Sheets-Sheet 4

Inventor
E. F. Norelius
by
Attorney

May 15, 1934.  E. F. NORELIUS  1,959,060
LUBRICATING SYSTEM
Filed Feb. 2, 1931  5 Sheets-Sheet 5

Inventor
E. F. Norelius
by
Attorney

Patented May 15, 1934

1,959,060

UNITED STATES PATENT OFFICE 1,959,060

LUBRICATING SYSTEM

Emil F. Norelius, Springfield, Ill., assignor to Allis-Chalmers Manufacturing Company, Milwaukee, Wis., a corporation of Delaware Application February 2, 1931, Serial No. 512,789

24 Claims. (Cl. 184—7)

This invention relates generally to lubricating systems and more particularly to force feed lubricating systems for vehicles, such as tractors or the like.

It is an object of the invention to provide a lubricating system whereby a multiplicity of bearings, such as the bearings for the load supporting rollers in track-laying tractors, may be simultaneously and periodically supplied with lubricant from a common source of supply whose main elements comprise a pump, a lubricant receiver adapted to be filled by said pump, and means for discharging lubricant from said receiver to said bearings in accordance with the requirements of the vehicle during operation.

Another object of the invention is to provide a lubricating system of the indicated type, in which the pipe lines connecting said receiver with the bearings are temporarily relieved from lubricant pressure every time before a new quantity of lubricant is discharged from said receiver, this being an essential feature if it is desired to equip each of the bearings with a certain well-known type of measuring device which will admit only a certain amount of lubricant at a time to each bearing, and thereafter will remain blocked up until it is relieved from the lubricant pressure acting upon it, as will be more fully described later in this specification.

Another object of the invention is to provide a lubricating system wherein a continuously working pump is alternately and automatically brought into and out of communication with a receiver, and wherein said receiver is discharged during the time while said pump is out of communication therewith, the flow of lubricant delivered from the pump during such time being preferably utilized to create pressure for expelling the lubricant from said receiver.

Still another object of the invention is to provide a lubricating system wherein lubricant delivered from a pump is permitted to accumulate within a lubricant receiver, and discharge of lubricant therefrom is effected by pressure means as soon as a predetermined amount of lubricant has accumulated within said receiver, and wherein such discharge is automatically stopped as soon as the pressure set up by said pressure means exceeds a predetermined value, such excess pressure causing said pressure means to become inactive and permitting a new charge of predetermined volume to accumulate within said receiver, whereupon the cycle of operations may repeat itself. In other words, the object stated is to provide a lubricating system adapted to give periodic and automatic lubrication without being dependent on a definite volume of lubricant discharged at each period of lubrication.

Still another object of the invention is to provide a lubricating system for periodic and automatic lubrication of a group or series of bearings, consisting of an ordinary plunger pump, a piston valve and a cylinder element containing a piston, so interrelated as to produce automatic discharges of lubricant from said cylinder element to said bearings.

These and other objects and advantages of the invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

Fig. 3 is an enlarged top elevation of the lubricating device and cooperating tractor parts shown in Fig. 2.

Fig. 4 is an enlarged side elevation of the lubricating device and cooperating tractor parts shown in Fig. 1.

Fig. 5 is an end view of the lubricating device shown in Fig. 4, the view being taken from the inside of the transmission casing.

Figure 1:
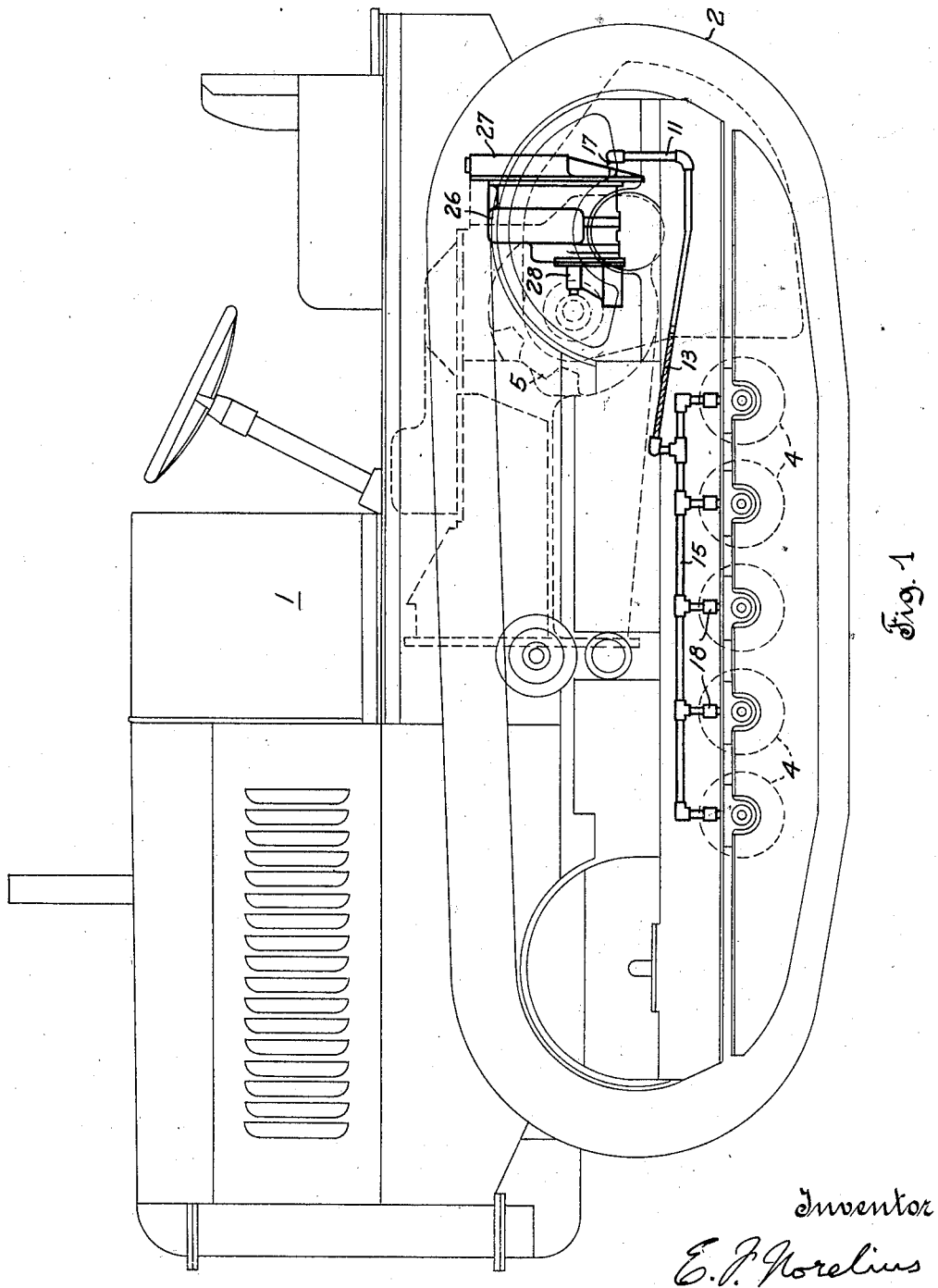
Fig. 1 is a side elevation of a track-laying tractor equipped with a lubricating system embodying the invention.
Figure 2:
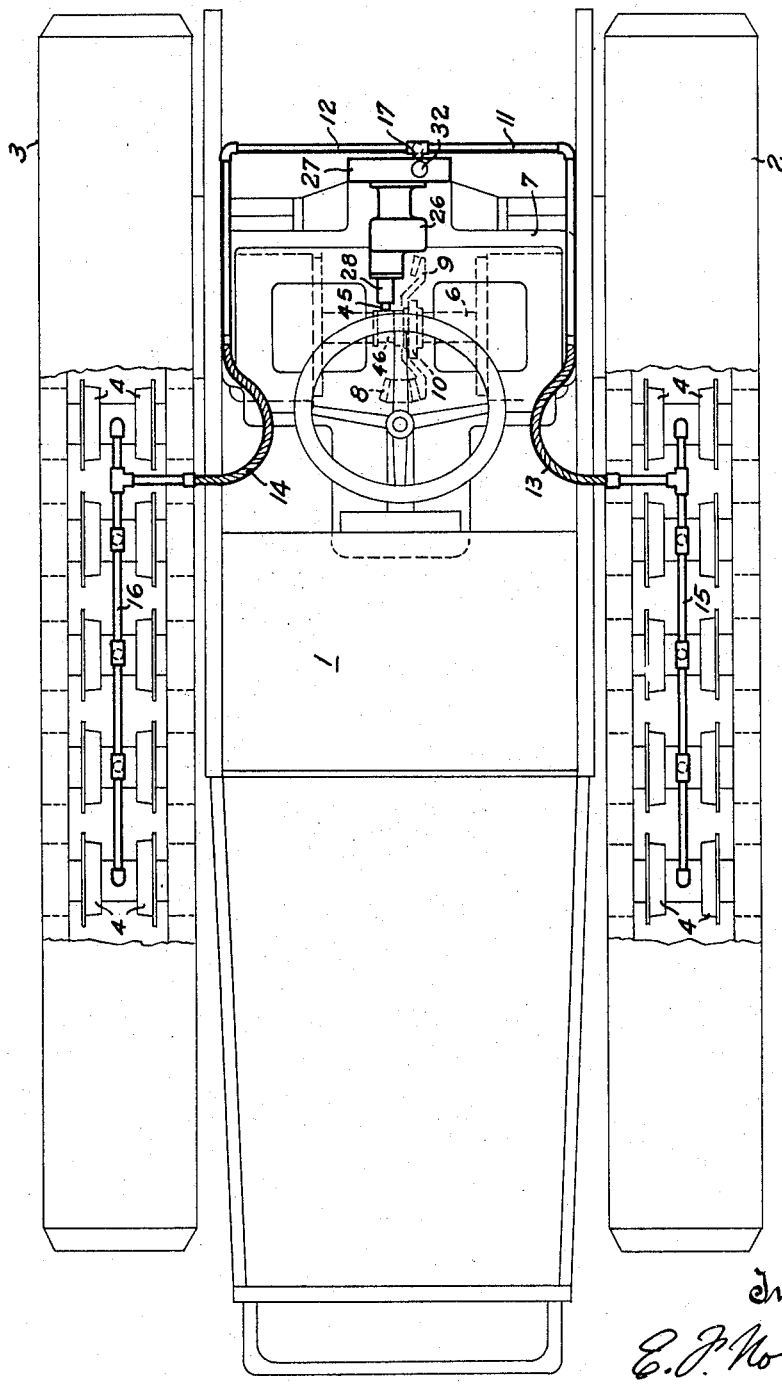
Fig. 2 is a top view of the tractor shown in Fig. 1.
Figure 6:
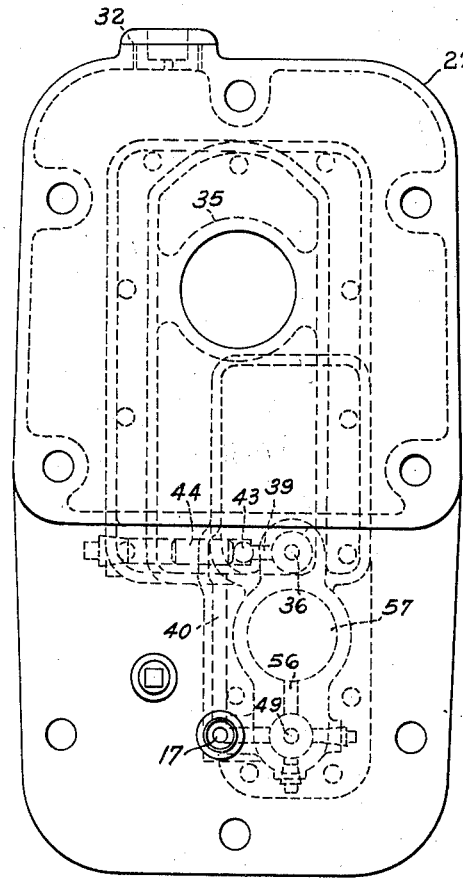
Fig. 6 is an end view of the lubricating device shown in Fig. 4, the view being taken from the outside of the transmission casing.
Figure 14:
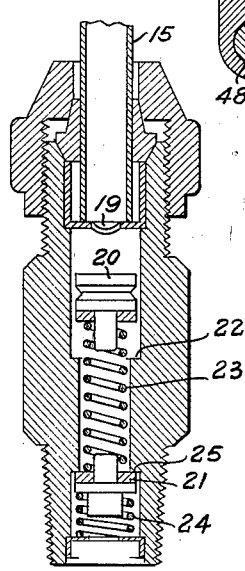
Figs. 11 to 14 are sections through one of the measuring valves installed at the roller bearings of the tractor shown in Fig. 1, each of the figures showing the valve in a different operating condition.
Figures 11, 12, 13:
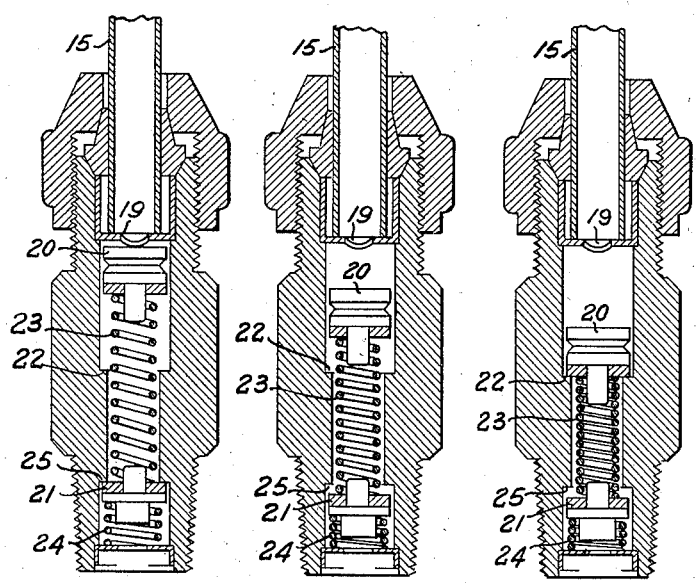

The numeral 1 in Figs. 1 and 2 indicates generally a tractor of the self-laying track type, whose track belts—indicated by 2 and 3—cooperate in well-known manner with load supporting rollers 4. Each track belt is driven by a sprocket wheel 5 to which power is applied through any suitable means from a main cross shaft 6 journaled in the transmission housing 7 of the tractor. A bevel pinion 8 in driving connection with the motor of the tractor, and a bevel gear 9 fastened to a hub 10 mounted on the cross shaft 6 are provided to rotate the main cross shaft 6. Enclosed within a rearward portion of the transmission housing 7 and mounted in a rearward opening of said housing is a mechanism for supplying the bearings of the load supporting rollers 4 periodically and automatically with lubricant. The lubricant is delivered to the bearings through a pipe system which is laid out in the following manner: Two rigid pipe lines 11 and 12 mounted on the chassis of the tractor are connected to the discharge conduit 17 of the lubricating mechanism, and distributor pipes 15 and 16 mounted on the left hand and right hand roller truck of the tractor, respectively, are connected to the pipe lines 11 and 12, respectively, by flexible pipes 13 and 14 allowing the rigid distributor pipes to move relative to the rigid pipe lines 11 and 12 when the roller trucks move relative to the tractor chassis. Interposed between each roller bearing and the distributor pipes 15 and 16 on the respective roller trucks are measuring valves 18 whereby a predetermined amount of lubricant is admitted to each bearing when pressure is applied to the lubricant in the pipe lines, and whereby any further escape of lubricant from the pipe system is prevented as soon as all bearings have received their measured charge of lubricant. The measuring valves are of well-known design, and their operation is illustrated by Figs. 11 to 14. Under the action of the mechanism in the rear portion of the transmission housing 7 lubricant is forced through the distributor pipes 15 and 16, passing through a screen 19 of each valve and acting on a valve piston 20. All the lubricant ahead of piston 20 is forced out past check valve 21, as shown in Fig. 12, and delivered to the respective bearing. This delivery continues until piston 20 is seated on a valve seat 22 and the valve is shut off as shown in Fig. 13. It will be noted that the downward movement of piston 20 delivers a measured charge of lubricant to the bearing, and after this delivery the valve is positively shut off with no more lubricant passing until the pressure in the pipe system is relieved. This will be automatically accomplished by the mechanism in the transmission housing 7, whereupon a spring 23 moves the piston 20 toward the valve inlet until it reaches the upper limit of its stroke as shown in Fig. 11. The return movement of piston 20, due to the clearance provided between piston 20 and the valve body, causes lubricant to be transferred from the chamber above piston 20 to the spring chamber below said piston, and during this period check valve 21, under the force of a spring 24, will be held tightly seated against its seat 25, as shown in Fig. 14. Thus each valve will be completely loaded with lubricant when the pressure is relieved on the delivery lines.

Figure 8:
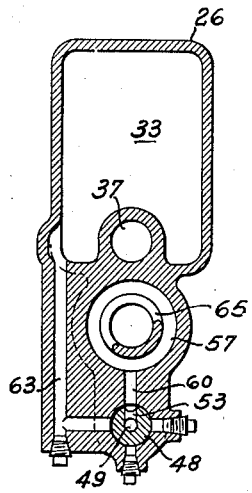
Fig. 8 is a section taken on line VIII—VIII of Fig. 4.
Figure 7:
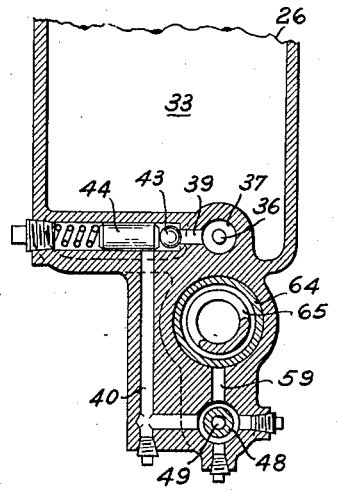
Fig. 7 is a section taken on line VII—VII of Fig. 4.
Figure 9:
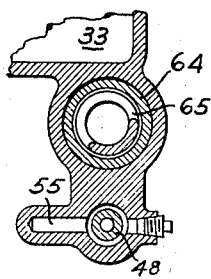
Fig. 9 is a section taken on line IX—IX of Fig. 4.
Figure 10:
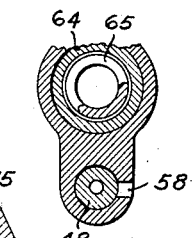
Fig. 10 is a section taken on line X—X of Fig. 4.

The lubricating mechanism associated with the rear portion of the transmission housing forms a substantially self-contained unit which is made up in three sections, viz: a main section 26, a right end section 27 and a left end section 28, the end sections being fastened to the main section by any suitable means, such as bolts 29 and 30, respectively. The whole unit is held in place within the transmission housing 7 by the end section 27 which covers an opening in the rear wall of said housing and is fastened thereto by bolts 31. The end section 27 has a hollow upper portion in communication with a hollow upper portion of the main section 26, the communicating chambers forming a reservoir 33 for the lubricant which is to be supplied to the bearings of the load supporting rollers 4. The lubricant may be filled into the reservoir through an opening 32 provided in the upper portion of the end section 27. A cylindrical wall 34 extends horizontally through the main section 26 and a cylindrical wall 35, coaxially with the wall 34, extends through the end section 27, the cylindrical chamber formed by both walls being open at its ends and adapted to accommodate a power take-off shaft extending from the interior of the transmission housing 7 to the outside of said housing. The lower portion of the main section 26 forms a substantially solid body and provides a cylinder block for a plurality of pistons each of which is reciprocable independently of the others. The first piston 36 in the upper part of the block cooperates with a pump cylinder 37 having an inlet port 38 in communication with the lubricant reservoir 33, and an outlet port 39 in communication with a passage 40 (Fig. 7) leading into a cylinder 41 in the bottom portion of the block. The inlet port 38 and the outlet port 39 are controlled by ball check valves 42 and 43, respectively, a little plunger 44 being placed between the ball of the outlet valve 43 and its cooperating spring. The plunger 36 is operated through an auxiliary plunger 45 mounted in the end section 28 and coooperating with an eccentric portion 46 which is formed on the hub 10 associated with the bevel gear 9. A spring 47 acting upon the piston 36 holds the piston 45 in contact with the eccentric portion 46. Reciprocable within the cylinder 41 at the bottom of the cylinder block is a valve piston 48 which has a longitudinal bore 49 extending from one end of the piston but not penetrating the other end. On its outside the valve piston is provided with two wide annular recesses 50 and 51 and with a narrow annular recess 52. Moreover, the valve piston has a short radial drill connecting the annular recess 50 with the bore 49, and another radial drill 53 (Fig. 8) at the inner end of the bore 49. A strong compression spring 54 mounted in a lower portion of the end section 28 tends to hold the right hand end of the piston (Fig. 4) in contact with the end wall of the cylinder 41, said end wall having no opening and being formed by a lower portion of the end section 27. The lubricant discharge conduit 17 communicates with the annular cylinder space formed by the recess 51 through the medium of a passage 55 extending partly through the end section 27 and partly through the cylinder block portion of the main section 26. In addition to the pump cylinder 37 and the valve cylinder 41 the cylinder block portion of the main section 26 contains a third cylinder 57 formed by a bore of comparatively large diameter, parallel to and substantially coextensive in length with the valve cylinder 41. The cylinder 57 is closed at one end by the lower portion of the end section 27, and at the other end by the end section 28, a passage 56 connecting the cylinder 57 with the valve cylinder 41 near the end of the latter adjacent to the end section 27. The recess 51 of valve piston 48 is arranged to be in communication with passage 56 when the valve piston abuts against the closed right end of cylinder 41 (Fig. 4) and, when the valve piston is moved for a predetermined distance towards the left, against the action of spring 54, communication between passage 56 and recess 51 is interrupted. A vent hole 58 in the wall of valve cylinder 41 is located adjacent to the end of passage 55 so that, when the valve piston 48 has been moved for said predetermined distance against the action of spring 54, recess 51 of valve piston 48 establishes communication between passage 55 and vent hole 58, such communication permitting the establishment of atmospheric pressure in the lubricant discharge conduit 17 while the latter is out of communication with passage 56. The annular cylinder space formed by the recess 50 is designed to constantly remain in communication with the passage 40, no matter whether the piston is in its extreme right position as shown in Fig. 4, or whether it has been moved to the left in order to bring the passage 55 in communication with the vent hole 58. In the vertical plane of the passage 40 there is another passage, indicated by 59 in Fig. 7, which connects the cylinder 41 with the cylinder 57 and, like the passage 40, remains in constant communication with the annular space formed by the recess 50. In addition to the passages 56 and 59 connecting the cylinder 41 with the cylinder 57, a third passage 60 of the same nature is provided at the left hand end of the cylinder 41. This passage is best shown in Fig. 8 and adapted to communicate with the longitudinal bore 49 of the valve piston through the radial drill 53 when the piston occupies the position shown in Fig. 4. In order to prevent the valve piston from turning within its cylinder, and to insure proper registering of the drill 53 with the passage 60 when the piston is in its extreme right position a guide pin 61 is mounted in the left end of the piston, said guide pin cooperating with a slot 62 in the portion of the end section 28 which houses the spring 54. A passage 63, hereinafter called an outlet passage, connects the valve cylinder 41 with the reservoir 33 (Fig. 8), the outlet passage 63 being disposed in the same vertical plane as the passage 60 and adapted to communicate therewith through the medium of the narrow annular recess 52 of the valve piston when the latter has been moved to the left in Fig. 4, in order to bring the discharge conduit 17 in communication with the vent hole 58. A skirted piston 64 reciprocable within the cylinder 57 is subjected to the action of a spring 65 which tends to push the piston toward the end of cylinder 57 which is closed by the end section 27. The piston has an axially projecting lug 66 which, by engaging the end wall of the cylinder, brings the piston to a stop before the passage 56 leading from the cylinder 41 into the cylinder 57 has been covered by the piston 64. In its extreme right position as shown in Fig. 4, the skirt of piston 64, however, closes the passage 59 leading into the cylinder 57, and the port formed in cylinder 57 by this passage will not be uncovered until the piston has been moved backward past said port.

Figure 15:
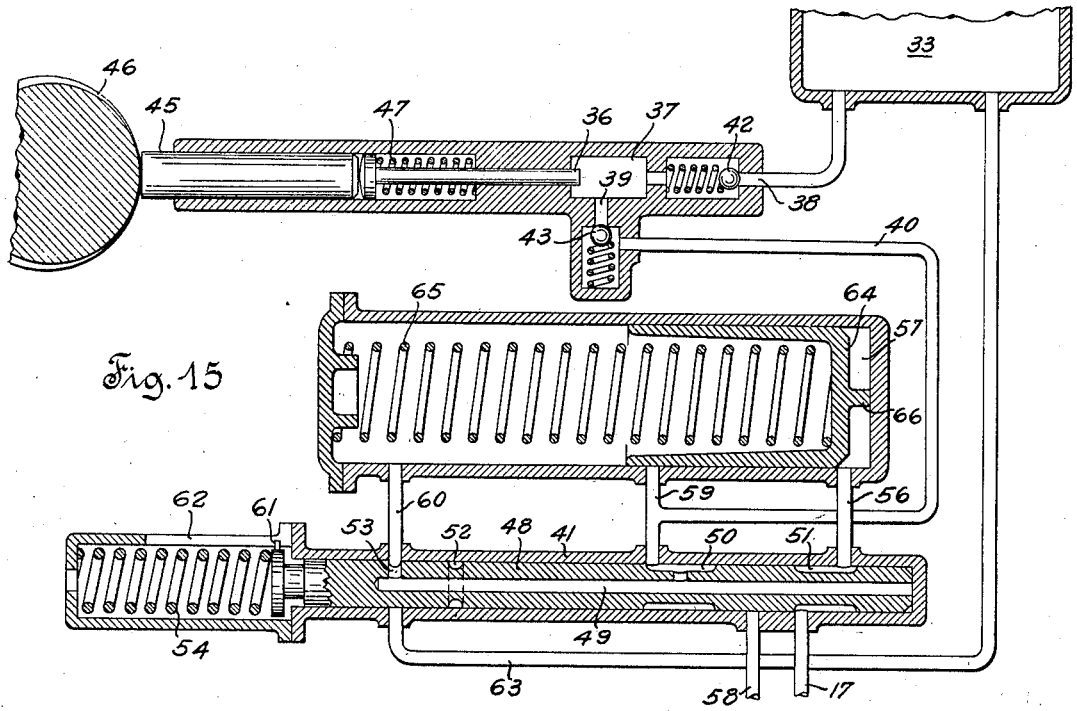
Figs. 15 and 16 are diagrammatic views of the lubricating system according to the invention, Fig. 15 showing the system in a condition characterizing the end of a discharge period during which a maximum amount of lubricant has been discharged, and Fig. 16 showing the system in a preparatory condition preceding the discharge of lubricant.
Figure 16:
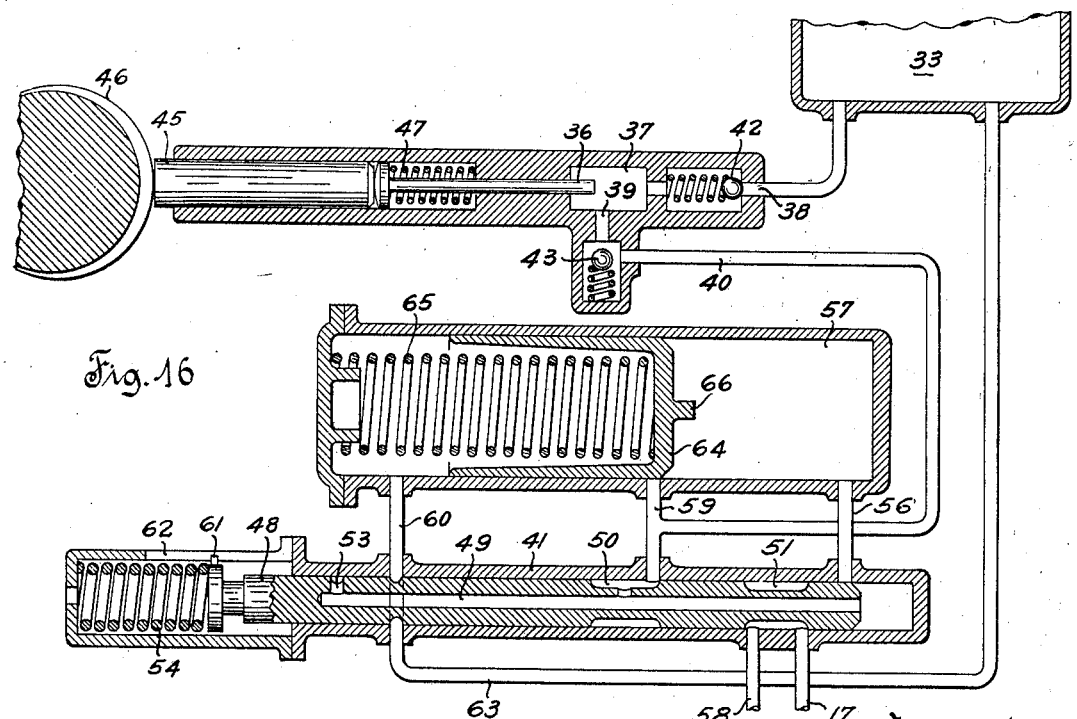

Referring now to the diagrammatic views of Figs. 15 and 16 it will be seen that these figures exhibit all essential elements of the mechanism shown in Figs. 3 to 10, but in such an arrangement that the operation of the device will be understood at a glance. Supposing the reservoir 33 has been filled with lubricant and the eccentric member 46 is constantly revolving while the valve piston 48 and the piston 64 occupy the positions shown in Fig. 15. The plunger 36 will then pump lubricant from the reservoir 33 through the passage 40, the annular space formed by recess 50 and through the radial drill at this recess into the longitudinal bore 49 of the valve piston 48 whose right hand end is kept under considerable force in contact with the end wall of the valve cylinder 41 by the strong spring 54. From the bore 49 the lubricant will be delivered through the radial drill 53 and the passage 60 in o the cylinder 57, and accumulate therein at the side of piston 64 facing the left closed end of the cylinder, the circumferential inner surface of the cylinder, the inner surface of its left end wall and the piston 64 forming the confines of a space to be called a left lubricant receiving chamber. Delivery of lubricant in o the left receiving chamber will continue until the pressure set up therein and in the bore 49 by the pump mechanism reaches a value sufficiently high to cause the valve piston 48 to yield to this lubricant pressure and to move to the left against the action of spring 54. Lubricant will then accumulate in the space between the right end wall of cylinder 41 and the right end of piston 48, the inner circumferential surface of valve cylinder 41, the inner surface of its right end wall and the piston 48 forming the confines of a space to be called a pressure chamber. Accumulation of fluid in the pressure chamber will continue until valve piston 48 has been crowded back so far that the passage 56 leading from the valve cylinder into the cylinder space 57 is uncovered by the valve piston. While the piston 48 is moving backwardly the radial drill 53 is brought out of communication with the passage 60 and shut off, and in a certain position of the piston, as shown in Fig. 16, the passage 60 is brought in communication with the outlet passage 63 leading to the reservoir 33, through the medium of the annular recess 52. Lubricant delivered by the pump will now force its way from the right end of the valve cylinder into the cylinder 57 through the passage 56, and accumulate therein at the side of piston 64 facing the right closed end of the cylinder, the circumferential inner surface of the cylinder 57, the inner surface of its right end wall and the piston 64 forming the confines of a space to be called a right receiving chamber. While the right receiving chamber is being charged with lubricant the valve piston 48 will oscillate slightly back and forth so as to alternately open and close the passage 56, such oscillations of the valve piston being caused by the intermittent discharge of lubricant from the pump mechanism and by the action of spring 54 which forces the valve piston to close the passage 56 during each suction stroke of the pump plunger 36. The passage 60 and the outlet passage 63, however, will remain in communication with each other during such oscillations of the valve piston, the back and forth movements of the latter being only short and not sufficient to cause the port of passage 60 or the port of passage 63 in valve cylinder 41 to be closed. Accumulation of lubricant in the right receiving chamber will cause the piston 64 to move backward against the action of spring 65, the piston on its backward stroke discharging the lubricant which had previously accumulated in the left receiving chamber, through passage 60 and outlet passage 63 into reservoir 33. At a certain point of its stroke towards the left end of cylinder 57 piston 64 will uncover the passage 59 which is in communication with the longitudinal bore 49 of the valve piston. As soon as the piston 64 uncovers the passage 59 the valve piston will be relieved from the lubricant pressure set up by the pump within the bore 49 and within the pressure chamber at the right end of the valve cylinder 41, and the latter will move under the action of spring 54 into the original position shown in Fig. 15, crowding the lubricant from the pressure chamber into the right receiving chamber of cylinder 57 through passage 59. Such transfer of lubricant will readily take place if the lubricant pressure per square inch set up by the spring 54 is considerably higher, for instance eight times as high as the lubricant pressure per square inch set up by the spring 65. After the valve piston has returned into its original position lubricant delivered from the pump will now be directed again into the left receiving chamber, but as piston 64 is now in the position shown in Fig. 16 and the right receiving chamber has been filled with lubricant, the lubricant pressure set up by the pump will aid the spring 65 in moving the piston 64 toward the right, such movement causing lubricant to be discharged from the receiver through the passage 56 into the annular space formed by the recess 51 and from there into the discharge conduit 17 which communicates with the measuring valves 18. Let it be supposed now that all measuring valves have received their measured quantity of lubricant and that the piston 64 has approached the right end wall of the cylinder space 57 only so far that the lug 66 does not touch said end wall. Further discharge of lubricant from the right receiving chamber will be impossible as the valve pistons 20 of all measuring valves are held down on their seats 22 (Fig. 13) by the lubricant pressure, but the plunger 36 nevertheless will continue to press lubricant into the passage 40. The pressure acting upon the piston 64 and also upon the valve piston 48 will therefore soon reach the critical value which is required to move the piston 48 against the action of spring 54 into the position shown in Fig. 16. The right receiving chamber will then be refilled as described hereinbefore, and it will be noted that the discharge conduit 17 is kept in communication with the vent 58 through the medium of the recess 51 while the lubricant accumulates in the right receiving chamber. The pipe system in communication with the measuring valves will therefore be relieved from any lubricant pressure, and the pistons 20 of the measuring valves will move from the position shown in Fig. 13 into the position shown in Fig. 11.

It will be seen that the operation of the device does not depend on a definite volume of lubricant to be discharged at each period of lubrication, as the piston 64 may come to a stop anywhere on its travel toward the right end wall of the cylinder 57.

It should be understood that it is not intended to limit the invention to the exact details of construction herein shown and described, for various modifications within the scope of the claims may occur to persons skilled in the art.

It is claimed and desired to secure by Letters Patent:

1. In a lubricating system, a continuously working feed mechanism, a lubricant receiver adapted to be filled by said feed mechanism, a discharge conduit associated with said receiver, a vent associated with said discharge conduit, pressure means actuated by lubricant delivered from said feed mechanism for ejecting lubricant from said receiver into said discharge conduit, valve means adapted to bring said discharge conduit alternately into communication with said receiver and said vent, and means for alternating the action of said valve means.

2. In a fluid distributing system, a feed mechanism, a fluid receiver adapted to be filled by said feed mechanism, a discharge conduit associated with said receiver, a vent associated with said discharge conduit, pressure means for ejecting fluid from said receiver, a fluid conduit line, fluid directing means adapted to direct the fluid delivered from said feed mechanism alternately to said receiver and said fluid conduit line, valve means adapted to bring said discharge conduit alternately in communication with said vent and said receiver, and means for actuating said fluid directing means and said valve means in interdependence such as to cause said receiver and said feed mechanism to communicate while said discharge conduit is in communication with said vent, and to cause said receiver and said discharge conduit to communicate while said vent is out of communication with said discharge conduit, and said feed mechanism is in communication with said fluid conduit line.

3. In a fluid distributing system, a feed mechanism; a cylinder element having a first opening adjacent to one end thereof and a second opening adjacent to the other end thereof; a piston reciprocable within said cylinder element, a fluid delivery line associated with the cylinder space at one side of said piston; a vent associated with said fluid delivery line; a fluid conduit line associated with the cylinder space at the other side of said piston; fluid directing means adapted to direct the fluid delivered from said feed mechanism alternately to said first and second opening of said cylinder element; valve means adapted to establish, in a primary position, communication between said fluid delivery line and its associated cylinder space while preventing communication between said fluid conduit line and its associated cylinder space, and between said fluid delivery line and said vent; and adapted to establish, in a secondary position, communication between said fluid conduit line and its associated cylinder space, and between said fluid delivery line and said vent, while preventing communication between said fluid delivery line and its associated cylinder space; and means for actuating said fluid directing means and said valve means in interdependence such as to cause said first cylinder opening to communicate with said feed mechanism while said valve means are in their secondary position, and to cause said feed mechanism to communicate with said second cylinder opening while said valve means are in their primary position.

4. In a fluid distributing system, a feed mechanism; a cylinder element having a first opening adjacent to one end thereof and a second opening adjacent to the other end thereof; a piston reciprocable within said cylinder element; fluid control means including a housing having an inlet opening in communication with said feed mechanism, a first outlet opening in communication with said first opening of said cylinder element, a second outlet opening in communication with said second opening of said cylinder element, a third outlet opening and a fourth outlet opening; a fluid delivery line in communication with said third outlet opening; fluid directing means within said housing, adapted to direct the fluid delivered from said feed mechanism alternately to said first and second outlet openings, valve means within said housing, acting, in a primary position, to connect the first and third outlet openings of said housing, while preventing communication between the second and fourth outlet openings thereof, and acting, in a secondary position, to prevent communication between said first and third outlet openings of said housing while connecting the second and fourth outlet openings thereof; and means for actuating said fluid directing means and said valve means in interdependence so that said feed mechanism is in communication with said first outlet opening of said housing while said valve means are in their secondary position, and that said feed mechanism is in communication with said second outlet opening of said housing while said valve means are in their primary position.

5. In a fluid distributing system, a feed mechanism; a cylinder element having a first opening adjacent to one end thereof and a second opening adjacent to the other end thereof; a piston reciprocable within said cylinder element; fluid control means including a housing having an inlet opening in communication with said feed mechanism, a first outlet opening in communication with said first opening of said cylinder element, a second outlet opening in communication with said second opening of said cylinder element, a third outlet opening and a fourth outlet opening; a fluid delivery line in communication with said third outlet opening; a fluid reservoir connected to said feed mechanism, and in communication with said fourth outlet opening; fluid directing means within said housing adapted to direct the fluid delivered from said feed mechanism alternately to said first and second outlet openings; valve means within said housing, acting in a primary position, to connect the first and third outlet openings of said housing, while preventing communication between the second and fourth outlet openings thereof, and acting, in a secondary position to prevent communication between said first and third outlet openings of said housing, while connecting the second and fourth outlet openings thereof; and means for actuating said fluid directing means and said valve means in interdependence so that said feed mechanism is in communication with said first outlet opening of said housing while said valve means are in their secondary position, and that said feed mechanism is in communication with said second outlet opening of said housing, while said valve means are in their primary position.

6. In a fluid distributing system, a feed mechanism; a cylinder element having a first opening adjacent to one end thereof and a second opening adjacent to the other end thereof; a piston reciprocable within said cylinder element; fluid control means including a housing having an inlet opening in communication with said feed mechanism, a first outlet opening in communication with said first opening of said cylinder element, a second outlet opening in communication with said second opening of said cylinder element, a third outlet opening, a fourth outlet opening, and a vent opening, the latter being associated with said third outlet opening; a fluid delivery line in communication with said third outlet opening; fluid directing means within said housing adapted to direct the fluid delivered from said feed mechanism alternately to said first and second outlet openings, valve means within said housing acting, in a primary position, to connect the first and third outlet openings of said housing, while preventing communication between the second and fourth outlet openings thereof, and preventing communication between said third outlet opening and said vent opening, and acting, in a secondary position, to prevent communication between said first and third outlet openings of said housing while connecting the second and fourth outlet openings, and connecting said third outlet opening and said vent opening; and means for actuating said fluid directing means and said valve means in interdependence so that said feed mechanism is in communication with said first outlet opening of said housing while said valve means are in their secondary position, and that said feed mechanism is in communication with said second outlet opening of said housing while said valve means are in their primary position.

7. In a fluid distributing system, a feed mechanism; a cylinder element having a first opening adjacent to one end thereof and a second opening adjacent to the other end thereof; a piston reciprocable within said cylinder element; fluid control means including a housing having an inlet opening in communication with said feed mechanism, a first outlet opening in communication with said first opening of said cylinder element, a second outlet opening in communication with said second opening of said cylinder element, a third outlet opening, a fourth outlet opening, and a vent opening, the latter being associated with said third outlet opening, a fluid delivery line in communication with said third outlet opening; a fluid reservoir connected to said feed mechanism, and in communication with said fourth outlet opening; fluid directing means within said housing adapted to direct the fluid delivered from said feed mechanism alternately to said first and second outlet openings, valve means within said housing acting, in a primary position, to connect the first and third outlet openings of said housing, while preventing communication between the second and fourth outlet openings thereof, and preventing communication between said third outlet opening and said vent opening, and acting, in a secondary position, to prevent communication between said first and third outlet openings of said housing while connecting the second and fourth outlet openings and connecting said third outlet opening and said vent opening; and means for actuating said fluid directing means and said valve means in interdependence so that said feed mechanism is in communication with said first outlet opening of said housing while said valve means are in their secondary position, and that said feed mechanism is in communication with said second outlet opening of said housing while said valve means are in their primary position.

8. In a fluid distributing system, a feed mechanism; a fluid receiver adapted to be filled by said feed mechanism; a discharge conduit associated with said receiver; a vent associated with said discharge conduit; pressure means for ejecting fluid from said receiver; fluid control means adapted to alternately effect and prevent delivery of fluid from said feed mechanism to said receiver; valve means adapted to bring said discharge conduit alternately into communication with said receiver and said vent; and means for actuating said fluid control means and said valve means in interdependence such as to cause said receiver to be charged with fluid from said feed mechanism while said discharge conduit is out of communication with said receiver and in communication with said vent, and to cause said receiver to communicate with said discharge conduit while delivery of fluid from said feed mechanism to said receiver is prevented.

9. In a fluid distributing system, a continuously working feed mechanism, a fluid receiver adapted to be filled by said feed mechanism, a discharge conduit associated with said receiver, a vent associated with said discharge conduit, pressure means for ejecting fluid from said receiver, fluid directing means including a housing having an inlet opening in communication with said feed mechanism, a first outlet opening in communication with said receiver, and a second outlet opening; and control means within said housing adapted to bring said inlet opening alternately in communication with said first and second outlet openings; valve means adapted to bring said discharge conduit alternately in communication with said vent and said receiver, and means for actuating said control means and valve means in interdependence such as to cause said receiver and said feed mechanism to communicate while said discharge conduit is in communication with said vent, and to cause said feed mechanism and said second outlet opening to communicate while said receiver is in communication with said discharge conduit; and said vent is out of communication with said discharge conduit.

10. In combination, a source of fluid, a fluid receiving chamber, a fluid passage, a valve mechanism associated with said source, receiving chamber and fluid passage and adapted to establish, in a primary position, communication between said receiving chamber and said fluid passage, and adapted to establish, in a secondary position, communication between said receiving chamber and said source while preventing communication between said receiving chamber and said fluid passage, a pressure chamber, means for feeding fluid under pressure into said pressure chamber, a control element displaceable within said pressure chamber from a primary to a secondary position by fluid accumulating within said pressure chamber from said source of fluid, pressure means urging said control element to counteract the pressure of such accumulating fluid while it is moved towards and held in its secondary position by such fluid, said control element being operatively connected with said valve mechanism so that the latter is in its primary position while said control element is in one of its said positions and so that said valve mechanism is in its secondary position while said control element is in the other of its said positions, means for discharging fluid from said receiving chamber while the latter is in communication with said fluid passage, a movable element associated with said receiving chamber so as to move in one direction coincident to accumulation of fluid in said receiving chamber and so as to move in another direction coincident to discharge of fluid from said receiving chamber, relief means associated with said pressure chamber and permitting, when effective, escape of fluid from said pressure chamber, said relief means being operatively connected with said movable element so as to cause said relief means to be effective when said movable element has moved to a predetermined position.

11. In combination, a source of fluid, a fluid receiving chamber, an outlet passage, a valve mechanism associated with said source, receiving chamber and outlet passage and adapted to establish, in a primary position, communication between said receiving chamber and said source while preventing communication between said receiving chamber and said outlet passage, and adapted to establish, in a secondary position, communication between said receiving chamber and said outlet passage, a pressure chamber, means for feeding fluid under pressure into said pressure chamber, a control element displaceable within said pressure chamber from a primary to a secondary position by fluid accumulating within said pressure chamber from said source of fluid, pressure means urging said control element to counteract the pressure of such accumulating fluid while it is moved towards and held in its secondary position by such fluid, said control element being operatively connected with said valve mechanism so that the latter is in its primary position while said control element is in its primary position and so that said valve mechanism is in its secondary position while said control element is in its secondary position, means for discharging fluid from said receiving chamber while the latter is in communication with said outlet passage, a movable element associated with said receiving chamber so as to move in one direction coincident to accumulation of fluid in said receiving chamber and so as to move in another direction coincident to discharge of fluid from said receiving chamber, relief means associated with said pressure chamber and permitting, when effective, escape of fluid from said pressure chamber, said relief means being operatively connected with said movable element so as to cause said relief means to remain ineffective as long as the volume of fluid in said receiving chamber is above a predetermined value and so as to cause said relief means to be effective when the volume of fluid in said receiving chamber is below said predetermined value.

12. In combination, a source of fluid, a first and a second fluid receiving chamber, a valve mechanism associated with said source and receiving chambers and adapted to establish, in a primary position, communication between said source and said second receiving chamber while preventing communication between said source and said first receiving chamber, and adapted to establish, in a secondary position, communication between said source and said first receiving chamber while preventing communication between said source and said second receiving chamber, a pressure chamber, means for feeding fluid under pressure into said pressure chamber, a control element displaceable within said pressure chamber from a primary to a secondary position by fluid accumulating within said pressure chamber from said source of fluid, pressure means urging said control element to counteract the pressure of such accumulating fluid while it is moved towards and held in its secondary position, said control element being operatively connected with said valve mechanism so that the latter is in its primary position while said control element is in one of its said positions and so that said valve mechanism is in its secondary position while said control element is in the other of its said positions, means for discharging said first receiving chamber while said second receiving chamber is in communication with said source, a movable element associated with said first receiving chamber so as to move in one direction coincident to accumulation of fluid therein and so as to move in another direction coincident to discharge of fluid from said first receiving chamber, relief means associated with said pressure chamber and permitting, when effective, escape of fluid from said pressure chamber, said relief means being operatively connected with said movable element so as to cause said relief means to be effective when said movable element has moved to a predetermined position.

13. In combination, a source of fluid, a first and a second fluid receiving chamber, a valve mechanism associated with said source and receiving chambers and adapted to establish, in a primary position, communication between said source and said second receiving chamber while preventing communication between said source and said first receiving chamber, and adapted to establish, in a secondary position, communication between said source and said first receiving chamber while preventing communication between said source and said second receiving chamber, a pressure chamber, means for feeding fluid under pressure into said pressure chamber, a control element displaceable within said pressure chamber from a primary to a secondary position by fluid accumulating within said pressure chamber from said source of fluid, pressure means urging said control element to counteract the pressure of such accumulating fluid while it is moved towards and held in its secondary position, said control element being operatively connected with said valve mechanism so that the latter is in its primary position while said control element is in one of its said positions and so that said valve mechanism is in its secondary position while said control element is in the other of its said positions, means including an ejector member movably associated with said receiving chambers, whereby fluid is ejected from said first receiving chamber while said second receiving chamber is in communication with said source and whereby fluid is ejected from said second receiving chamber while said first receiving chamber is in communication with said source, relief means associated with said pressure chamber and permitting, when effective, escape of fluid from said pressure chamber, said relief means being operatively connected with said ejector member so as to cause said relief means to be effective when said ejector member has moved to a predetermined position.

14. In combination, a source of fluid, a first and a second fluid receiving chamber, a valve mechanism associated with said source and receiving chambers and adapted to establish, in a primary position, communication between said source and said second receiving chamber while preventing communication between said source and said first receiving chamber, and adapted to establish, in a secondary position, communication between said source and said first receiving chamber while preventing communication between said source and said second receiving chamber, a pressure chamber, means for feeding fluid under pressure into said pressure chamber, a control element displaceable within said pressure chamber from a primary to a secondary position by fluid accumulating within said pressure chamber from said source of fluid, pressure means urging said control element to counteract the pressure of such accumulating fluid while it is moved towards and held in its secondary position, said control element being operatively connected with said valve mechanism so that the latter is in its primary position while said control element is in its primary position and so that said valve mechanism is in its secondary position while said control element is in its secondary position, means including an ejector member movably associated with said receiving chambers, whereby fluid is ejected from said first receiving chamber while said second receiving chamber is in communication with said source, and whereby fluid is ejected from said second receiving chamber while said first receiving chamber is in communication with said source, relief means associated with said pressure chamber and permitting, when effective, escape of fluid from said pressure chamber, said relief means being operatively connected with said ejector member so as to remain ineffective as long as the volume of fluid in said first receiving chamber is below a predetermined value and so as to be effective when the volume of fluid in said first receiving chamber is above said predetermined value.

15. In combination, a source of fluid, a first and a second fluid receiving chamber, a discharge conduit and an outlet passage, a valve mechanism associated with said source, receiving chambers, discharge conduit and outlet passage, and adapted to establish, in a primary position, communication between said first receiving chamber and said discharge conduit and between said second receiving chamber and said source, while preventing communication between said first receiving chamber and said source and between said second receiving chamber and said outlet passage, and adapted to establish, in a secondary position, communication between said first receiving chamber and said source, and between said second receiving chamber and said outlet passage, while preventing communication between said first receiving chamber and said discharge conduit and between said second receiving chamber and said source, a pressure chamber, means for feeding fluid under pressure into said pressure chamber from said source of fluid, a control element displaceable within said pressure chamber from a primary to a secondary position by fluid accumulating within said pressure chamber, pressure means urging said control element to counteract the pressure of such accumulating fluid while it is moved towards and held in its secondary position, said control element being operatively connected with said valve mechanism so that the latter is in its primary position while said control element is in its primary position, and so that said valve mechanism is in its secondary position while said control mechanism is in its secondary position, an ejector member movably associated with said receiving chambers so as to eject fluid from said first receiving chamber while said second receiving chamber is in communication with said source and so as to eject fluid from said second receiving chamber while said first receiving chamber is in communication with said source, relief means associated with said pressure chamber and permitting, when effective, escape of fluid from said pressure chamber, said relief means being operatively connected with said ejector member so as to cause said relief means to remain ineffective as long as the volume of fluid in said first receiving chamber is below a predetermined value and so as to cause said relief means to be effective when the volume of fluid in said first receiving chamber is above said predetermined value.

16. In combination, a fluid feed mechanism having an outlet port, a pressure chamber in communication with said outlet port, a fluid receiving chamber, a fluid passage, a valve mechanism associated with said pressure chamber, receiving chamber and fluid passage and adapted to establish, in one position, communication between said receiving chamber and said pressure chamber while preventing communication between said receiving chamber and said fluid passage, and adapted to establish, in another position, communication between said receiving chamber and said fluid passage while preventing communication between said receiving chamber and said pressure chamber, a control element displaceable within said pressure chamber from a primary to a secondary position by fluid accumulating within said pressure chamber, which fluid is supplied by said fluid feed mechanism, pressure means urging said control element to counteract the pressure of such accumulating fluid while said control element is moved towards and held in its secondary position by such fluid, said control element being operatively connected with said valve mechanism so that the latter is in one of its said positions while said control element is in its primary position and so that said valve mechanism is in the other of its said positions while said control element is in its secondary position, means for discharging fluid from said receiving chamber while the latter is in communication with said fluid passage, a movable element associated with said receiving chamber so as to move in one direction coincident to accumulation of fluid in said receiving chamber and so as to move in another direction coincident to discharge of fluid from said receiving chamber, relief means associated with said pressure chamber and permitting, when effective, escape of fluid from said pressure chamber, said relief means being operatively connected with said movable element so as to cause said relief means to be effective when said movable element has moved to a predetermined position.

17. In combination, a fluid feed mechanism having an outlet port, a pressure chamber in communication with said outlet port, a fluid receiving chamber, a discharge conduit, a valve mechanism associated with said pressure chamber, receiving chamber and discharge conduit and adapted to establish, in a primary position, communication between said receiving chamber and discharge conduit while preventing communication between said receiving chamber and said pressure chamber, and adapted to establish, in a secondary position, communication between said receiving chamber and said pressure chamber while preventing communication between said receiving chamber and said discharge conduit, a control element displaceable within said pressure chamber from a primary to a secondary position by fluid accumulating within said pressure chamber, which fluid is supplied by said fluid feed mechanism, pressure means urging said control element to counteract the pressure of such accumulating fluid while said control element is moved towards and held in its secondary position by such fluid, said control element being operatively connected with said valve mechanism so that the latter is in its primary position while said control element is in its primary position and so that said valve mechanism is in its secondary position while said control element is in its secondary position, means for discharging fluid from said receiving chamber while the latter is in communication with said discharge conduit, a movable element associated with said receiving chamber so as to move in one direction coincident to accumulation of fluid in said receiving chamber and so as to move in another direction coincident to discharge of fluid from said receiving chamber, relief means associated with said pressure chamber and permitting, when effective, escape of fluid from said pressure chamber, said relief means being operatively connected with said movable element so as to cause said relief means to remain ineffective as long as the volume of fluid in said receiving chamber is below a predetermined value and so as to cause said relief means to be effective when the volume of fluid in said receiving chamber is above said predetermined value.

18. In combination, a fluid feed mechanism having an outlet port, a pressure chamber in communication with said outlet port, a fluid receiving chamber, an outlet passage, a valve mechanism associated with said pressure chamber, receiving chamber and outlet passage and adapted to establish, in a primary position, communication between said pressure chamber and said receiving chamber while preventing communication between said receiving chamber and said outlet passage, and adapted to establish, in a secondary position, communication between said receiving chamber and said outlet passage while preventing communication between said receiving chamber and said pressure chamber, a control element displaceable within said pressure chamber from a primary to a secondary position by fluid accumulating within said pressure chamber, which fluid is supplied by said fluid feed mechanism pressure means urging said control element to counteract the pressure of such accumulating fluid while said control element is moved towards and held in its secondary position by such fluid, said control element being operatively connected with said valve mechanism so that the latter is in its primary position while said control element is in its primary position and so that said valve mechanism is in its secondary position while said control element is in its secondary position, means for discharging fluid from said receiving chamber while the latter is in communication with said outlet passage, a movable element associated with said receiving chamber so as to move in one direction coincident to accumulation of fluid in said receiving chamber and so as to move in another direction coincident to discharge of fluid from said receiving chamber, relief means associated with said pressure chamber and permitting, when effective, escape of fluid from said pressure chamber, said relief means being operatively connected with said movable element so as to cause said relief means to remain ineffective as long as the volume of fluid in said receiving chamber is above a predetermined value and so as to cause said relief means to be effective when the volume of fluid in said receiving chamber is below said predetermined value.

19. In combination, a fluid feed mechanism having an outlet port, a pressure chamber in communication with said outlet port, a first and a second fluid receiving chamber, a valve mechanism associated with said pressure chamber and receiving chambers and adapted to establish, in a primary position, communication between said pressure chamber and said second receiving chamber while preventing communication between said pressure chamber and said first receiving chamber, and adapted to establish, in a secondary position, communication between said pressure chamber and said first receiving chamber while preventing communication between said pressure chamber and said second receiving chamber, a control element displaceable within said pressure chamber from a primary to a secondary position by fluid accumulating within said pressure chamber, which fluid is supplied by said fluid feed mechanism, pressure means urging said control element to counteract the pressure of such accumulating fluid while said control element is moved towards and held in its secondary position by such fluid, said control element being operatively connected with said valve mechanism so that the latter is in its primary position when said control element is in its primary position and so that said valve mechanism is in its secondary position when said control element is in its secondary position, means, including an ejector member movably associated with said receiving chambers, whereby fluid is ejected from said first receiving chamber while said second receiving chamber is in communication with said pressure chamber and whereby fluid is ejected from said second receiving chamber while said first receiving chamber is in communication with said pressure chamber, relief means associated with said pressure chamber and permitting, when effective, escape of fluid from said pressure chamber, said relief means being operatively connected with said ejector member so as to cause said relief means to remain ineffective as long as the volume of fluid in said first receiving chamber is below a predetermined value and so as to cause said relief means to be effective when the volume of fluid in said first receiving chamber is above said predetermined value.

20. In combination, a fluid feed mechanism having an outlet port, a pressure chamber in communication with said outlet port, a first and a second fluid receiving chamber, a discharge conduit, an outlet passage, a valve mechanism associated with said pressure chamber, receiving chambers, discharge conduit and outlet passage and adapted to establish, in a primary position, communication between said pressure chamber and said second receiving chamber and between said first receiving chamber and said discharge conduit while preventing communication between said pressure chamber and said first receiving chamber and between said second receiving chamber and said outlet passage, and adapted to establish, in a secondary position, communication between said pressure chamber and said first receiving chamber and between said second receiving chamber and said outlet passage while preventing communication between said pressure chamber and said second receiving chamber and between said first receiving chamber and said discharge conduit, a control element displaceable within said pressure chamber from a primary to a secondary position by fluid accumulating within said pressure chamber, which fluid is supplied by said fluid feed mechanism, pressure means urging said control element to counteract the pressure of such accumulating fluid while said control element is moved towards and held in its secondary position by such fluid, said control element being operatively connected with said valve mechanism so that the latter is in its primary position while said control element is in its primary position and so that said valve mechanism is in its secondary position while said control element is in its secondary position, an ejector member movably associated with said first and second receiving chambers so as to eject fluid from said first receiving chamber while said second receiving chamber is being charged and so as to eject fluid from said second receiving chamber while said first receiving chamber is being charged, relief means associated with said pressure chamber and permitting, when effective, escape of fluid from said pressure chamber, said relief means being operatively connected with said ejector member so as to cause said relief means to remain ineffective as long as the volume of fluid in said first receiving chamber is below a predetermined value and so as to cause said relief means to be effective when the volume of fluid in said first receiving chamber is above said predetermined value.

21. In combination, a source of fluid, a fluid receiving chamber, a discharge conduit, a valve mechanism associated with said source, receiving chamber and discharge conduit and adapted to establish, in a primary position, communication between said receiving chamber and said discharge conduit and adapted to establish, in a secondary position, communication between said receiving chamber and said source while preventing communication between said receiving chamber and said discharge conduit, a pressure chamber, means for feeding fluid under pressure into said pressure chamber, a control element displaceable within said pressure chamber from a primary to a secondary position by fluid accumulating within said pressure chamber from said source of fluid, pressure means urging said control element to counteract the pressure of such accumulating fluid while it is moved towards and held in its secondary position by such fluid, said control element being operatively connected with said valve mechanism so that the latter is in its primary position while said control element is in its primary position and so that said valve mechanism is in its secondary position while said control element is in its secondary position, means for discharging fluid from said receiving chamber while the latter is in communication with said discharge conduit, a movable element associated with said receiving chamber so as to move in one direction coincident to accumulation of fluid in said receiving chamber and so as to move in another direction coincident to discharge of fluid from said receiving chamber, relief means associated with said pressure chamber and permitting, when effective, escape of fluid from said pressure chamber, said relief means being operatively connected with said movable element so as to cause said relief means to remain ineffective as long as the volume of fluid in said receiving chamber is below a predetermined value and so as to cause said relief means to be effective when the volume of fluid in said receiving chamber is above said predetermined value.

22. In combination, a fluid feed mechanism having an outlet port, a pressure chamber in communication with said outlet port, a cylinder and a piston reciprocable within said cylinder, resilient means urging said piston towards one end of said cylinder, a discharge conduit, a valve mechanism associated with said discharge conduit, pressure chamber and cylinder and adapted to establish, in a primary position, communication between said discharge conduit and an interior space of said cylinder between said piston and the end of said cylinder towards which said piston is urged, and said valve mechanism being adapted to prevent, in its primary position, communication between said cylinder space and said pressure chamber, and being adapted to establish, in a secondary position, communication between said cylinder space and said pressure chamber while preventing communication between said cylinder space and said discharge conduit, a control element displaceable within said pressure chamber from a primary to a secondary position by fluid accumulating within said pressure chamber, which fluid is supplied by said fluid feed mechanism, pressure means urging said control element to counteract the pressure of such accumulating fluid while said control element is moved towards and held in its secondary position by such fluid, said control element being operatively connected with said valve mechanism so that the latter is in its primary position while said control element is in its primary position and so that said valve mechanism is in its secondary position while said control element is in its secondary position, relief means associated with said pressure chamber and permitting, when effective, escape of fluid from said pressure chamber, said relief means being operatively connected with said piston so as to cause said relief means to remain ineffective as long as the volume of fluid in said cylinder space is below a predetermined value and so as to cause said relief means to be effective when the volume of fluid in said cylinder space is above said predetermined value.

23. In combination, a fluid feed mechanism having an outlet port, a pressure chamber in communication with said outlet port, a fluid receiving chamber, a discharge conduit, a valve mechanism associated with said pressure chamber, receiving chamber and discharge conduit and adapted to establish, in a primary position, communication between said receiving chamber and discharge conduit while preventing communication between said receiving chamber and said pressure chamber, and adapted to establish, in a secondary position, communication between said receiving chamber and said pressure chamber while preventing communication between said receiving chamber and said discharge conduit, a control element displaceable within said pressure chamber from a primary to a secondary position by fluid accumulating within said pressure chamber, which fluid is supplied by said fluid feed mechanism, pressure means urging said control element to counteract the pressure of such accumulating fluid while said control element is moved towards and held in its secondary position by such fluid, said control element being operatively connected with said valve mechanism so that the latter is in its primary position while said control element is in its primary position and so that said valve mechanism is in its secondary position while said control element is in its secondary position, means for discharging fluid from said receiving chamber while the latter is in communication with said discharge conduit, a movable element associated with said receiving chamber so as to move in one direction coincident to accumulation of fluid in said receiving chamber and so as to move in another direction coincident to discharge of fluid from said receiving chamber, and relief means adapted to establish and prevent communication between said pressure chamber and said receiving chamber independently of said valve mechanism and controlled by said movable element so as to prevent escape of fluid from said pressure chamber into said receiving chamber through said relief means as long as the volume of fluid in said receiving chamber is below a predetermined value and so as to permit such escape when the volume of fluid in said receiving chamber has reached said predetermined value.

24. In combination, a fluid feed mechanism having an outlet port, a pressure chamber in communication with said outlet port, a first and a second fluid receiving chamber, a valve mechanism associated with said pressure chamber and receiving chambers and adapted to establish, in a primary position, communication between said pressure chamber and said second receiving chamber while preventing communication between said pressure chamber and said first receiving chamber, and adapted to establish, in a secondary position, communication between said pressure chamber and said first receiving chamber while preventing communication between said pressure chamber and said second receiving chamber, a control element displaceable within said pressure chamber from a primary to a secondary position by fluid accumulating within said pressure chamber, which fluid is supplied by said fluid feed mechanism, pressure means urging said control element to counteract the pressure of such accumulating fluid while said control element is moved towards and held in its secondary position by such fluid, said control element being operatively connected with said valve mechanism so that the latter is in its primary position when said control element is in its primary position and so that said valve mechanism is in its secondary position when said control element is in its secondary position, means including an ejector member movably associated with said receiving chambers, whereby fluid is ejected from said first receiving chamber while said second receiving chamber is in communication with said pressure chamber and whereby fluid is ejected from said second receiving chamber while said first receiving chamber is in communication with said pressure chamber, a fluid passage connecting said pressure chamber and said first receiving chamber independently of said valve mechanism and controlled by said ejector member so as to prevent escape of fluid from said pressure chamber into said first receiving chamber through said fluid passage as long as the volume of fluid in said first receiving chamber is below a predetermined value and so as to permit such escape when the volume of fluid in said first receiving chamber has reached said predetermined value.

EMIL F. NORELIUS.